(12) United States Patent
Baubert et al.

(10) Patent No.: US 9,875,511 B1
(45) Date of Patent: Jan. 23, 2018

(54) METHOD AND SYSTEM FOR DESKTOP-INVOKED IMAGE OR VIDEO CAPTURE

(71) Applicant: SIPREE, INC., San Francisco, CA (US)

(72) Inventors: Christophe Baubert, San Francisco, CA (US); Ramon Qiu, San Francisco, CA (US); Mark Sole, San Francisco, CA (US); Daryl Moulder, Sasn Francisco, CA (US); Brandon Chothia, San Francisco, CA (US)

(73) Assignee: Sipree, Inc., San Francisco, CA (US)

( * ) Notice: Subject to any disclaimer, the term of this patent is extended or adjusted under 35 U.S.C. 154(b) by 40 days.

(21) Appl. No.: 14/871,591

(22) Filed: Sep. 30, 2015

(51) Int. Cl.
| | |
|---|---|
| H04N 5/225 | (2006.01) |
| G06Q 40/00 | (2012.01) |
| H04N 5/232 | (2006.01) |
| G06Q 20/32 | (2012.01) |
| G06Q 20/20 | (2012.01) |
| H04W 4/14 | (2009.01) |
| H04L 29/08 | (2006.01) |
| H04H 20/38 | (2008.01) |
| G06F 17/30 | (2006.01) |

(52) U.S. Cl.
CPC ....... *G06Q 40/12* (2013.12); *G06F 17/30873* (2013.01); *G06Q 20/209* (2013.01); *G06Q 20/322* (2013.01); *H04H 20/38* (2013.01); *H04L 67/02* (2013.01); *H04L 67/10* (2013.01); *H04N 5/225* (2013.01); *H04N 5/23216* (2013.01); *H04W 4/14* (2013.01)

(58) Field of Classification Search
None
See application file for complete search history.

(56) References Cited

U.S. PATENT DOCUMENTS

| | | | | |
|---|---|---|---|---|
| 7,639,943 B1 * | 12/2009 | Kalajan | ............... | G03B 29/00 396/429 |
| 2002/0087601 A1 * | 7/2002 | Anderson | ......... | G06F 17/30017 715/210 |

(Continued)

OTHER PUBLICATIONS

Walsh, David (2012). Camera and video control with HTML5. https://davidwalsh.name/browser-camera.*

(Continued)

*Primary Examiner* — Peter L Ludwig
(74) *Attorney, Agent, or Firm* — Hickman Palermo Becker Bingham LLP (57) ABSTRACT

A method and apparatus for improving efficiency of capturing images of documents at computers is provided. The method comprises receiving an instruction to obtain an image of a document using a mobile computer device comprising a camera; generating a unique parameterized uniform resource locator (URL) that has been assigned to the image of the document; sending, to a mobile computer device, the URL using a messaging service and receiving, from the mobile computer device, an invocation of the image capture function specifying the GUID; uploading, from the mobile computer device, the image file; storing the image file in association with the GUID; in response to the instruction to obtain the image of the document, sending the image file to the first computer device.

20 Claims, 9 Drawing Sheets

(56) References Cited

U.S. PATENT DOCUMENTS

| | | | | |
|---|---|---|---|---|
| 2003/0026254 | A1* | 2/2003 | Sim | G06F 17/30194 370/392 |
| 2004/0014460 | A1* | 1/2004 | Moroo | G06T 1/0021 455/414.1 |
| 2004/0263660 | A1* | 12/2004 | Wang | H04M 1/0202 348/333.01 |
| 2005/0050165 | A1* | 3/2005 | Hamynen | G06F 17/30887 709/218 |
| 2005/0273698 | A1* | 12/2005 | Smith | G06F 17/30011 715/229 |
| 2006/0047844 | A1* | 3/2006 | Deng | G06F 17/3089 709/231 |
| 2006/0103762 | A1* | 5/2006 | Ly | H04N 1/00307 348/584 |
| 2008/0195716 | A1* | 8/2008 | Morris | H04M 1/274575 709/206 |
| 2008/0254827 | A1* | 10/2008 | Hunter | G06F 17/30879 455/556.1 |
| 2009/0144657 | A1* | 6/2009 | Zhang | H04L 51/38 715/810 |
| 2010/0016003 | A1* | 1/2010 | Shapiro | H04L 43/0811 455/466 |
| 2010/0214398 | A1* | 8/2010 | Goulart | H04N 21/2387 348/61 |
| 2010/0277611 | A1* | 11/2010 | Holt | G06F 17/30265 348/231.2 |
| 2012/0260330 | A1* | 10/2012 | Zlatarev | G06F 21/33 726/10 |
| 2012/0290679 | A1* | 11/2012 | Steinhauer | H04L 69/22 709/217 |
| 2012/0314917 | A1* | 12/2012 | Kiyohara | G06F 17/30029 382/118 |
| 2013/0155261 | A1* | 6/2013 | Poder | H04L 65/605 348/207.11 |
| 2013/0198336 | A1* | 8/2013 | Kridlo | H04L 67/06 709/219 |
| 2013/0259308 | A1* | 10/2013 | Klusza | G06K 9/00624 382/103 |
| 2013/0283388 | A1* | 10/2013 | Ashok | G06F 21/60 726/26 |
| 2014/0317517 | A1* | 10/2014 | Aoki | G06F 17/30887 715/738 |
| 2015/0016675 | A1* | 1/2015 | Kishi | G06Q 30/00 382/103 |
| 2015/0134949 | A1* | 5/2015 | Baldwin | H04W 12/02 713/153 |
| 2015/0278999 | A1* | 10/2015 | Summers | G06Q 10/10 345/419 |
| 2015/0356100 | A1* | 12/2015 | Strange | G06F 17/3089 715/202 |

OTHER PUBLICATIONS

Bidelman, Eric (2013). Capturing audio and video in HTML5—HTML5 Rocks.*

W3C Candidate Recommendation (Sep. 9, 2014). HTML Media Capture. W3C.*

Naicu, Octavian (Feb. 24, 2015). HTML5 video recording with HTML media capture and the mediastream recording/mediarecorder API. (hereinafter "Octavian").*

HTML5: A vocabulary and assocaited APIs for HTML and XHTML. W3C.*

W3C Last Call Working draft (Apr. 14, 2015). Media Capture and Streams. W3C.*

* cited by examiner

METHOD AND SYSTEM FOR DESKTOP-INVOKED IMAGE OR VIDEO CAPTURE

FIELD OF THE DISCLOSURE

The present disclosure relates to computer-based network communications and more specifically to using a server-based application and a desktop device to invoke a camera and an image capture function on a separate mobile computing device.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In computerized transactions, copies of paper documents may be required by one or more parties to the transaction. A user may use a scanner to scan a document into a computer-readable file that is uploaded to the computer as an image file. The user then selects the image file, manually associates the file with the transaction by saving the image file to a particular location or by identifying the particular location of the image file within the transaction.

In some instances, users may use two or more computers to perform various tasks. Some tasks, such as two-factor authentication, are performed using two or more devices that are associated with the same user. For example, when a user uses a first device to access an account, a message may be sent to a second device registered to the same user. The message may include a secret access code that can be entered by the user into the first device. The use of the second device to send the secret access code to the user is used to validate the identity of the user.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections herein according to the following outline:

1. GENERAL OVERVIEW
2. SYSTEM OVERVIEW
3. PROCESS OVERVIEW
4. HARDWARE OVERVIEW

1. General Overview

Systems and methods for invoking an image capture device using a desktop computer are provided. In one embodiment, a method of improving efficiency of capturing images of documents at computers, the method comprises the computer-implemented steps of: using a web server computer, receiving, from a first computer device, an instruction to obtain an image of a document using a mobile computer device comprising a camera; using the web server computer, generating a unique parameterized uniform resource locator (URL) comprising an image capture function identifier and a globally unique identifier (GUID) that has been assigned to the image of the document wherein the image capture function identifier identifies image capture program code of the web server computer which when invoked by the mobile computer device causes receiving an image file captured using the camera of the mobile computer device; using the web server computer, sending, to a mobile computer device, the URL using a messaging service and receiving, from the mobile computer device, an invocation of the image capture function specifying the GUID; using the web server computer, uploading, from the mobile computer device, the image file; using the web server computer, storing the image file in association with the GUID; using the web server computer, in response to the instruction to obtain the image of the document, sending the image file to the first computer device.

In one embodiment, desktop computer may initiate an electronic transaction with a web server that requires a copy of a paper document. Once a paper document is requested as part of the transaction, the desktop computer provides a telephone number associated with a smartphone device comprising a camera. The web server sends a text message to the smartphone device comprising a uniform resource locator (URL) accessible via the browser of the smartphone device. The URL comprises a Hypertext Markup Language five (HTML5) media capture field that, when selected, invokes the camera application of the smartphone device. Using the camera application and camera of the smartphone, an image of the requested document is captured. Upon selection of the captured image, the browser application uploads the selected image to the web server. The web server associates the uploaded image with the transaction between itself and the desktop computer.

The systems and methods discussed herein provide an improvement to the operation of a computer. The use of a smartphone rather than a dedicated peripheral such as a scanner reduces complexity and permits using a smartphone to capture an image rather than a scanner, which has limitations. Some documents may include color or shading that cannot be adequately captured by a scanner that does not support scanning color documents but can be captured using a camera. Some documents may not be in a flat paper form that could be inserted into a scanner but can be captured using a camera. Open messaging services such as text messaging via SMS permits a server-side application program to contact external devices as if they were locally coupled peripherals. Further, because the web server generates the hyperlink and the web page accessed by the smart phone, the image is automatically stored in association with the transaction when the image is received back at the server, reducing the potential for user error. This system also reduces complexity of alternative methods of utilizing the smartphone to capture receipts, which would require additional steps of relocating the photo files from the smartphone to a third party system such as email, a cloud storage system, and the local computer hard drive before it is moved into a portal. This system invokes the request from a line item within a portal for an image to be taken on the smartphone, and then directly inserts the image into the portal.

Other features, aspects and benefits will become apparent from the appended claims and the other description herein.

2. System Overview

Figure 1:
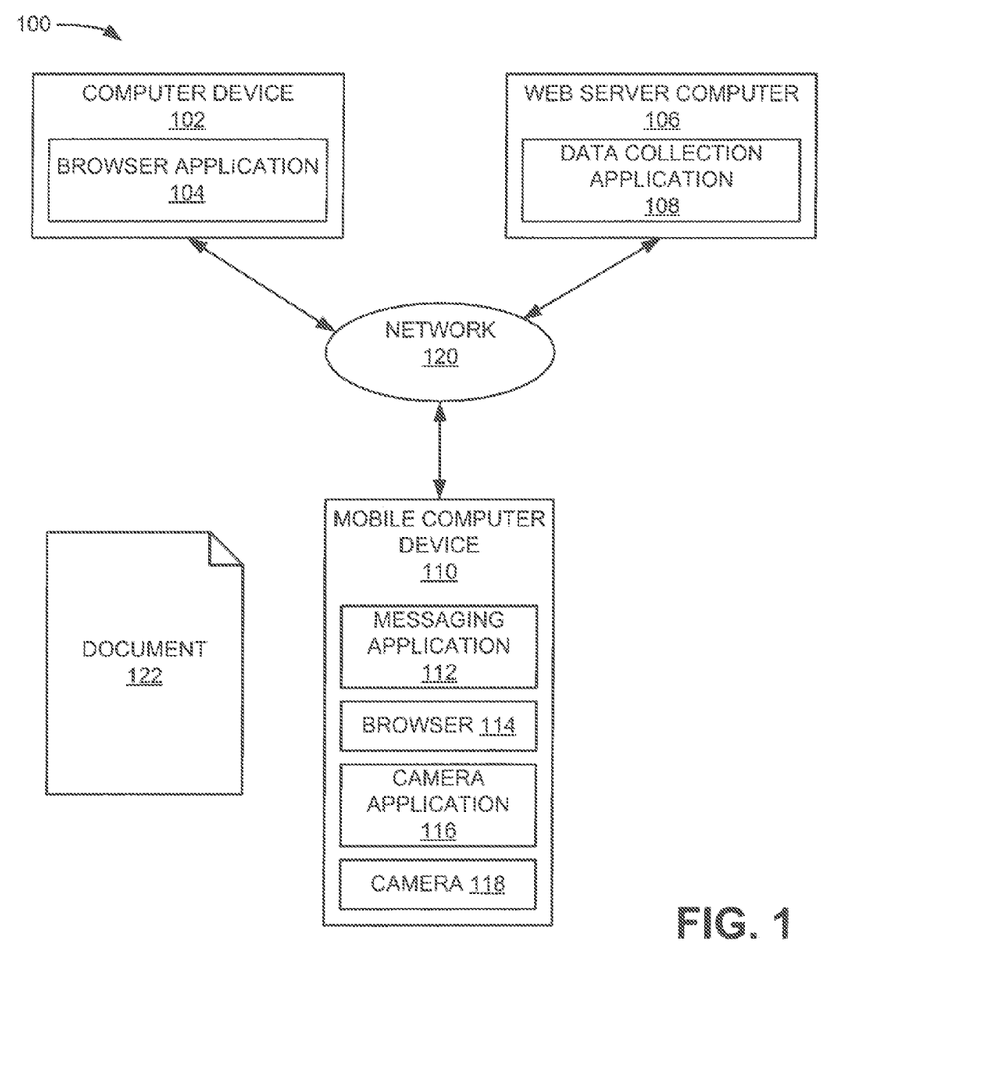
FIG. 1 illustrates an example of a networked computer system in which various embodiments may be practiced.

FIG. 1 illustrates an example of a networked computer system in which various embodiments may be practiced. In one embodiment, a networked computer system 100 comprises a computer device 102, a web server computer 106, and a mobile computer device 110 that are connected via a network 120. The networked computer system 100 is programmed to facilitate a desktop-invoked image capture of a document 122, which is typically physically located near the mobile computer device, but distant from the web server computer 106.

The computer device 102 broadly represents any device capable of executing an application, such as a browser, and may include a desktop computer or a laptop computer, a workstation. Typically, the computer device 102 comprises input means such as a keyboard, mouse, and/or touchscreen and display means such as a monitor, as well as one or more network interfaces. In some instances, the computer device 102 may comprise a video camera, such as a webcam. The computer device 102 may be preferred by users for browsing or displaying HTML or XML documents, entering text or filling out electronic forms. In some embodiments the resources or power available at the computer device 102, or other locally installed software, may be necessary or convenient for interacting with a server-based application.

The computer device 102 comprises one or more applications for performing tasks, and these applications may be general-purpose or special-purpose. An example application is a browser application 104 or an expense reimbursement management application. An example of a task is accessing a web-based application hosted at a server computer, receiving an electronic form, filling out the electronic form and submitting the completed form to the web server computer 106 via the web browser 104. An instance of an electronic form may be associated with a session identifier. The session identifier may be associated with data that identifies an instance of the form, the user completing the form, the type of form, and the provider of the form. The form itself may be associated with a plurality of line item identifiers. The line item identifiers may be used to identify particular fields in the form. For example, in a form comprising an expense report, a session identifier may be associated with the instance of the form and an expense may be associated with a line item identifier that can further be associated with an image of receipt or other document.

Within a particular application for performing a task, the task may include a request for an image of a particular document 122 or an option to provide or upload an image as part of an interaction with the web server computer 106 via the network 120. Optionally, the application may determine that the computer device 102 does not include a camera that may be used to capture an image of a document 122, but a test for the presence of a camera is not required. The application can instruct the web server computer 106 to request the computer device 102 to provide contact information for a mobile computer device 110, and can instruct the web server computer to send a link to the mobile computer device. Once the image is captured and acknowledged by the web server computer 106, the image of the document 122 is associated automatically with the request and the task. In some embodiments, the image is associated with a session identifier of the particular application and/or a line item identifier of the session or transaction.

In one embodiment, web server computer 106 comprises a data collection application 108 that communicates with the particular application to the computer device 102. The particular application may be a dedicated software application installed on the computer device 102 that connects to the network 120 or may be an online application or website accessible via the browser application 104 executed by the computer device 102. The data collection application 108 performs one or more tasks, including conducting transactions that may require a copy of a document 122. Examples of such transactions include identity verification, submission of an expense report, submission of an invoice, Automated Clearing House (ACH) and Electronic Funds Transfer (EFT) processing, tax preparation, home appraisals or inspections, insurance claims processing, retail or wholesale shopping or purchasing, transactions involving virtual goods, the photo or video capturing of a phenomenon that cannot be recorded in any other format, video of a verbal commitment on a transaction.

At some point in the performance of a task, the data collection application 108 determines to request an image of a document 122 from the computer device 102 or the application hosted or used there. In some instances, the data collection application 108 may require an image of the document 122 before the task is completed. In other words, the data collection application 108 may be programmed so that a workflow in the application cannot proceed until an image is received; in other embodiments, receiving an image may be optional. The data collection application 108 prompts the computer device 102 for the image by generating and providing an HTML document or causing a local screen display with a prompt.

The web server computer 106 generates a URL that is accessible using a browser of a mobile computer device 110. The URL is parameterized to invoke a server-side function that is programmed to cause capturing an image of the document 122 that was requested, at the mobile computer device 110. The URL may be associated with the session identifier and/or line item identifier. In some embodiments, the uniform resource locator (URL) includes the session identifier and/or line item identifier. Or, the URL may include a globally unique identifier (GUID) as a parameter which, when submitted back to the web server computer 106 by the mobile computer device 110, permits associating an uploaded image from the mobile computer device with a particular session, line item, application or function on the server side. In an embodiment, the URL comprises an HTML 5 media capture field that, when selected by the mobile computer device 110, causes invoking a camera application of the mobile computer device 110 that is coupled to and operates with a camera in the mobile computer device. The web server computer 106 acquires the image of the document 122 from the mobile computer device 110. In response, in one embodiment, the web server computer 106 generates and sends an acknowledgement to the mobile computer device 110 and to the computer device 102.

The mobile computer device 110 comprises a messaging application 112, a browser 114, a camera application 116, and a camera 118. The mobile computer device 110 further comprises means for communicating over a network, which may include any one or more of: a wireline network interface such as an Ethernet port; a wireless network interface such as a WiFi radio; a cellular radiotelephone radio or chipset. Using any of the means for communicating over a network, under control of an operating system and one or more programmed applications, the mobile computer device 110 can establish wired, wireless or radio links to the network 120 and communicate with the web server computer 106 via messaging, web protocols, or application-specific protocols. The mobile computer device 110 can comprise a feature phone, a smartphone, a personal digital assistant, a tablet computer, a wearable device such as a smart watch, or a digital camera.

The messaging application 112 is programmed to communicate one or more messages via the network 120 and may invoke a browser application. In one embodiment, messaging application may communicate short message service (SMS) messages and multimedia messaging service (MMS) messages. SMS messages and MMS messages are addressed to the telephone number of the mobile computer device 110. In other embodiments, other messaging applications 112 that address a message using an email address or social networking username may be used. The particular messaging protocol, mechanism or technique is not critical. Embodiments are most effective when the messaging technique is inherent to and natively supported by the mobile computer device 110, as well as open, public or otherwise accessible to the web server computer 106.

The browser 114 is a mobile browser application that is invoked by the messaging application 112. In one embodiment, the browser 114 is HTML 5 compliant. The browser 114 is capable of receiving URLs that are parameterized or configured and, when parsed or interpreted using the browser or an operating system of the mobile computer device 110, may invoke the camera application 116.

The camera application 116 controls the camera 118. The camera 118 is a digital camera having one or more lenses and an array of optical sensors for sensing light directed by the one or more lenses. The array of optical sensors (where each optical sensor represents a pixel) provides output signals indicative of the light sensed. The output signals from the array of optical sensors can be used to derive a captured image. The lens(es) of the camera 118 may be static or mechanically movable to implement an optical zoom.

3. Process Overview

Figure 2:
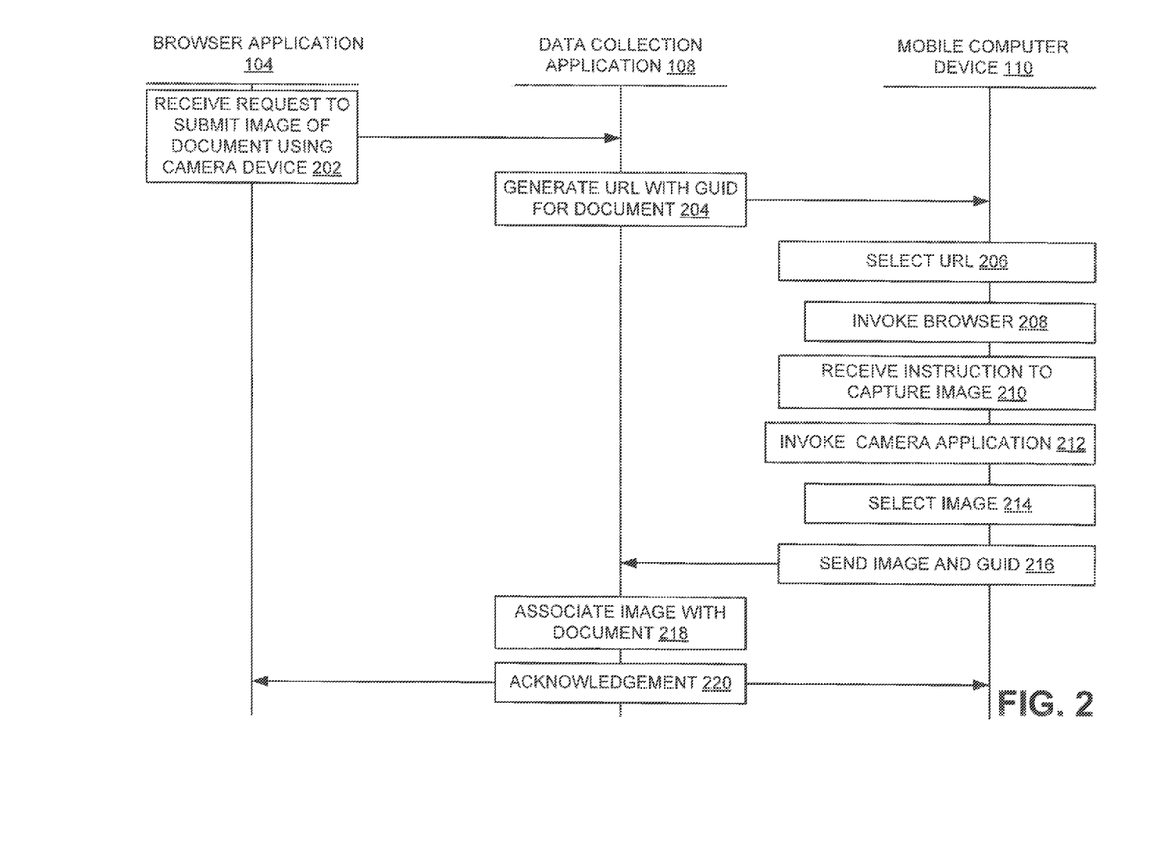
FIG. 2 is a flow diagram of an example method of desktop-invoked image capture.

FIG. 2 is a flow diagram of an example method of desktop-invoked image capture. For purposes of describing a clear example, this description presumes that the method of FIG. 2 is performed in the context of FIG. 1, by the browser application 104 on the computer device 102, the data collection application 108 on the web server computer 106, and the mobile computer device 110. FIG. 2 also may be implemented using environments other than as specifically shown in FIG. 1. While FIG. 2 is specific to image capture, the method of FIG. 2 may be performed when a video capture is used to document a transaction.

FIG. 2, and each other method diagram or flow diagram in this disclosure, is intended to describe an algorithm, process or other outline for how the functions shown in the drawing figure may be implemented in programming instructions for a computer. Any suitable programming language or development environment may be used such as JAVA, OBJECTIVE-C, C++, scripting languages, and the like. In practice, an implementation or embodiment will include program instructions for many steps other than those shown in the drawing figures, but FIG. 2 and each other method diagram or flow diagram in this disclosure, nevertheless indicate the algorithmic information that the inventors have deemed sufficient to communicate to a skilled programmer or software engineer how to implement the specified functions in complete working code.

In an operation 202, the browser application 104 receives a request to submit an image of a document from the computer device 102. The input may include selection of a menu item in an interface provided by the data collection application 108. The input may be associated with a session identifier assigned by the data collection application 108. Some inputs may be further associated with a line item identifier.

Figure 3A:
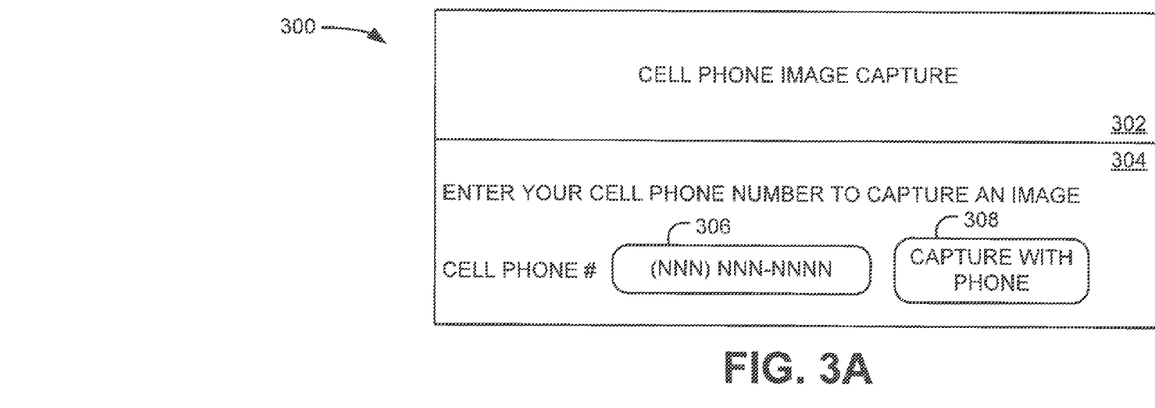
FIG. 3A and FIG. 3B depict different portions of a graphical user interface for desktop invocation of a capture of an image that may be generated under program control using an embodiment.
Figure 3B:
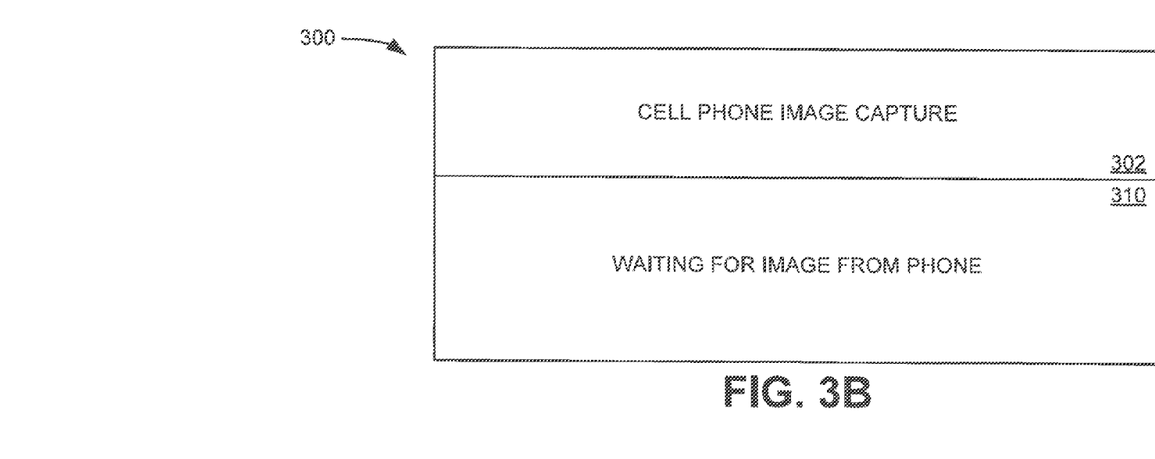

In some instances, in response to receiving the request to submit the image of the document, the data collection application 108 determines whether there is stored contact information for the mobile computer device 110 in association with an account or identifying record for a user of the computer device 102. The stored contact information may be a telephone number associated with the mobile computer device 110, a social media username of a user of the mobile computer device 110, or an email address of the user of the mobile computer device 110. If there is no stored contact information, the data collection application 108 may respond to the request by prompting the browser application 104 for contact information. For example, the display of FIG. 3A may be provided. FIG. 3A and FIG. 3B depict portions of a graphical user interface for desktop invocation of a capture of an image. FIG. 3A illustrates a portion 300 of a graphical user interface that may be displayed by the computer device 102. The portion 300 comprises an image capture portion 302 that is provided in response to the request to submit an image of a document. The portion 300 further comprises a contact information field 304 that comprises a telephone number field 306 for receiving a numerical telephone number. The contact information field 304 may further comprise fields for confirming or selecting stored contact information. The contact information field 304 may further be modified to receive an email address or social network username of the user.

The contact information field 304 comprises a button 308 that when selected, causes the data collection application 108 to send a URL to the telephone number. Upon receiving the contact information from the browser application 104, the data collection application 108 stores the contact information as stored contact information. In one embodiment, selecting button 308 causes the web server computer 106 to return an updated page to the computer device 102 as a placeholder while the image information is captured. For example, the screen display of FIG. 3B may be used, in which the contact information field 304 is replaced with a delay field 310. The delay field 310 includes an indication that the data collection application 108 is awaiting the image from the mobile computing device 110.

Referring again to FIG. 2, in an operation 204, the data collection application 108 generates a URL with a globally unique identifier (GUID) for the document. The GUID is a unique reference number used as an identifier of the document. The GUID can include the session identifier and/or line item identifier of the document. In some embodiments, the GUID can be generated from the session identifier and/or line item identifier of the document. In some embodiments, the GUID can be included in the URL as a query string. The URL causes the mobile computer device 110 to invoke a camera application 116 or directs the mobile computer device to a webpage having an HTML 5 media capture field that, when selected, invokes the camera application 116.

The data collection application 108 sends the URL to the mobile computer device 110 associated with the account or user using the stored contact information. The URL can be sent via SMS or MMS messaging, via a chat application associated with a social media network, or via an email message.

In an operation 206, the mobile computer device 110 receives the URL from the data collection application 108. Using the messaging application 112, the mobile computer device 110 displays the URL or a link to the URL.

Figure 4:
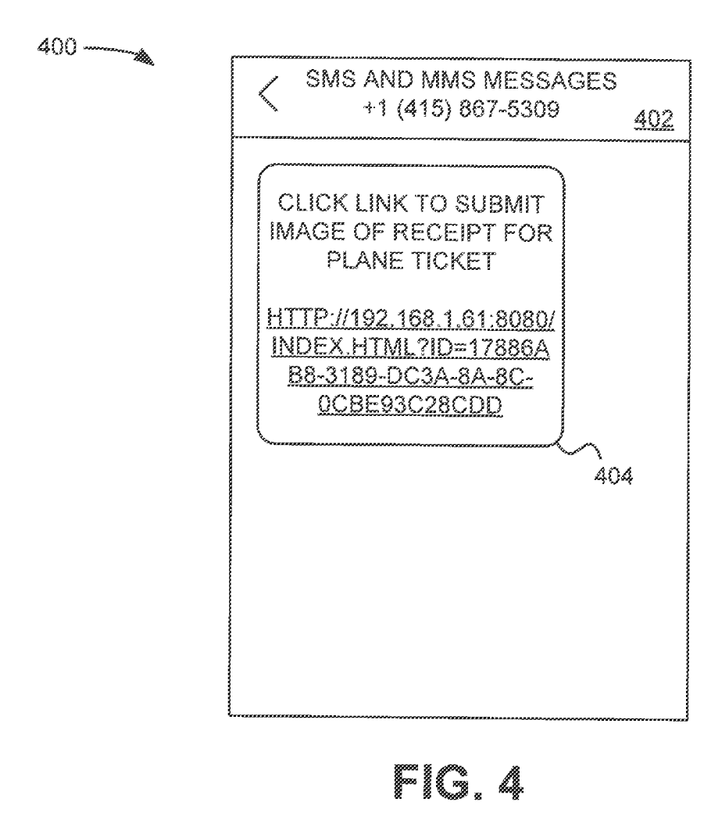
FIG. 4 depicts an example of a graphical user interface comprising a message sent from a data collection application to a mobile computing device, which may be generated under program control using an embodiment.

FIG. 4 depicts an example of a graphical user interface 400 comprising a message 404 sent from data collection application 108 to the mobile computing device 110. The graphical user interface 400 is provided by the mobile computer device 102 via an SMS and MMS application 402. The message 404 is an SMS or MMS message comprising a URL. As depicted, the URL includes the GUID assigned to the image as a search string. The message optionally includes a text description of the document or line item associated with the image. Via the messaging application 112, the mobile computer device 110 selects the URL by, for example, taping on the URL via a touchscreen.

Figure 5A:
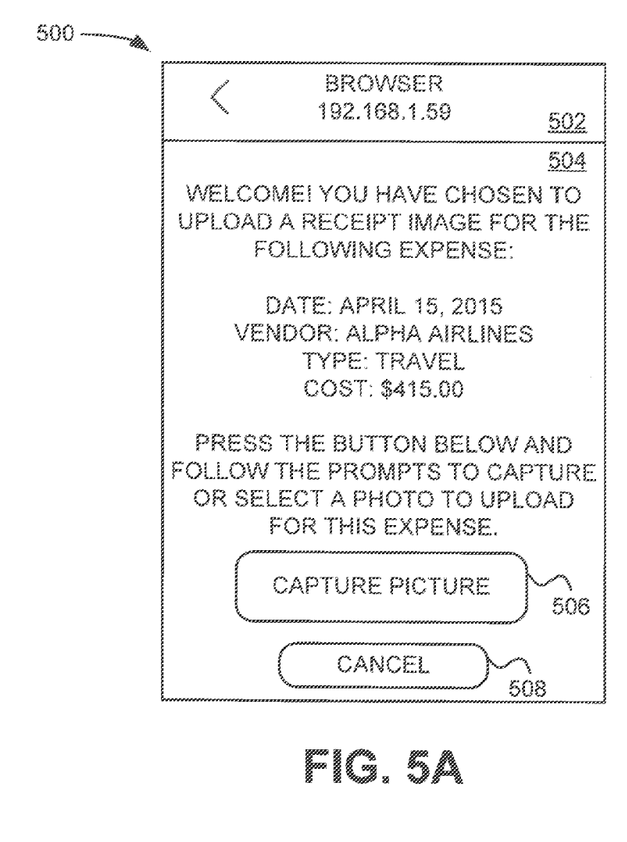
FIG. 5A and FIG. 5B depict examples of webpages accessible on a browser for capturing an image and that may be generated under program control using an embodiment.
Figure 5B:
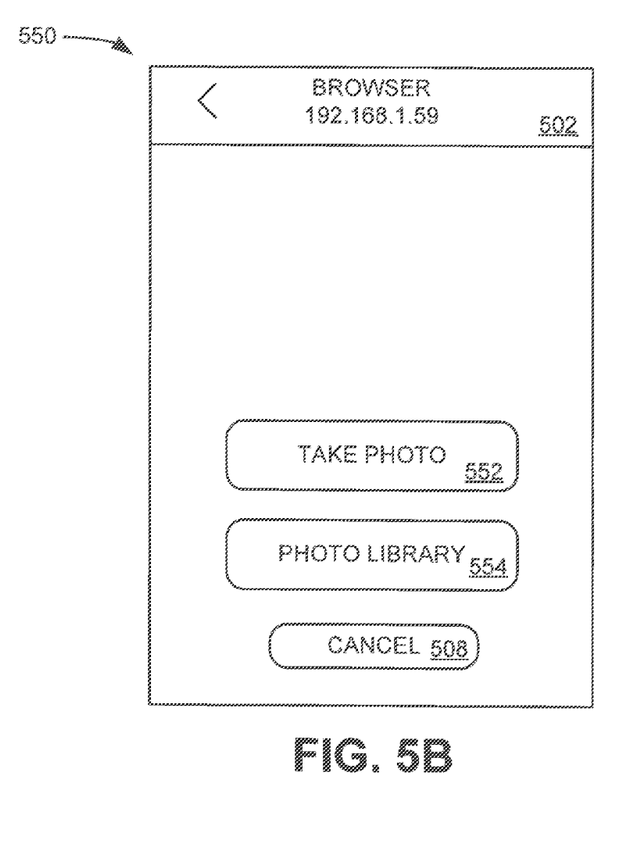

Referring again to FIG. 2, in an operation 208, the messaging application 112 invokes the browser 114 on the mobile computer device 110. The browser may display a webpage associated with the URL. In an optional operation 210, the browser 114 receives a further instruction from the mobile computer device to capture an image of a document. For example, FIG. 5A and FIG. 5B depict examples of graphical user interfaces 500 and 550 accessible via a browser 114 for capturing an image. The graphical user interfaces 500 and 550 are displayed on the mobile computer device 110. The graphical user interface 500 is displayed within the browser 114 of the mobile computer device 110 when the URL in the message 404 is selected. The interface 500 comprises a first portion 502 that may indicate the URL. In a second portion 504 of the graphical user interface 500, optional text directs the user to select button 506 to capture an image of the indicated document. A cancel button 508 is provided that, when selected, directs the data collection application 108 to cancel the image capture process at both the mobile computer device 110 and the computer device 102.

The graphical user interface 550 of FIG. 5B is displayed when the button 506 is selected by the user. The graphical user interface 550 further includes one or more buttons such as take photo button 552, a photo library button 554, and the cancel button 508. The take photo button 552, when selected, invokes the camera application 116 and the camera 118 on the mobile computer device 110. The photo library button 554 invokes the camera application 116 or other photo or file management application installed on the mobile computer device 110 from which the user can select a stored image. In some cases, the photo library button can direct the mobile computer device 110 to a web-based photo-sharing application or social network application within which photos can be accessed. In some embodiments, the stored image can be an electronic receipt sent to the mobile computer device 110 by a vendor via email or another messaging service.

The URL may invoke an HTML 5 media capture field that instructs the browser 114 to invoke the camera application 116. An example of an HTML 5 media capture field is:
<input type="file" accept="image/*;capture=camera">

Referring again to FIG. 2, in an operation 212, the browser 114 invokes the camera application 116. The user can then use the camera application 116 to instruct the camera 118 to capture an image of the document. The user may use the camera application 116 to capture more than one image of the document. Once an image of the document is captured, in an operation 214, the user can select an image of the document from among a plurality of images stored on the mobile computer device 110.

Figures 6A, 6B:
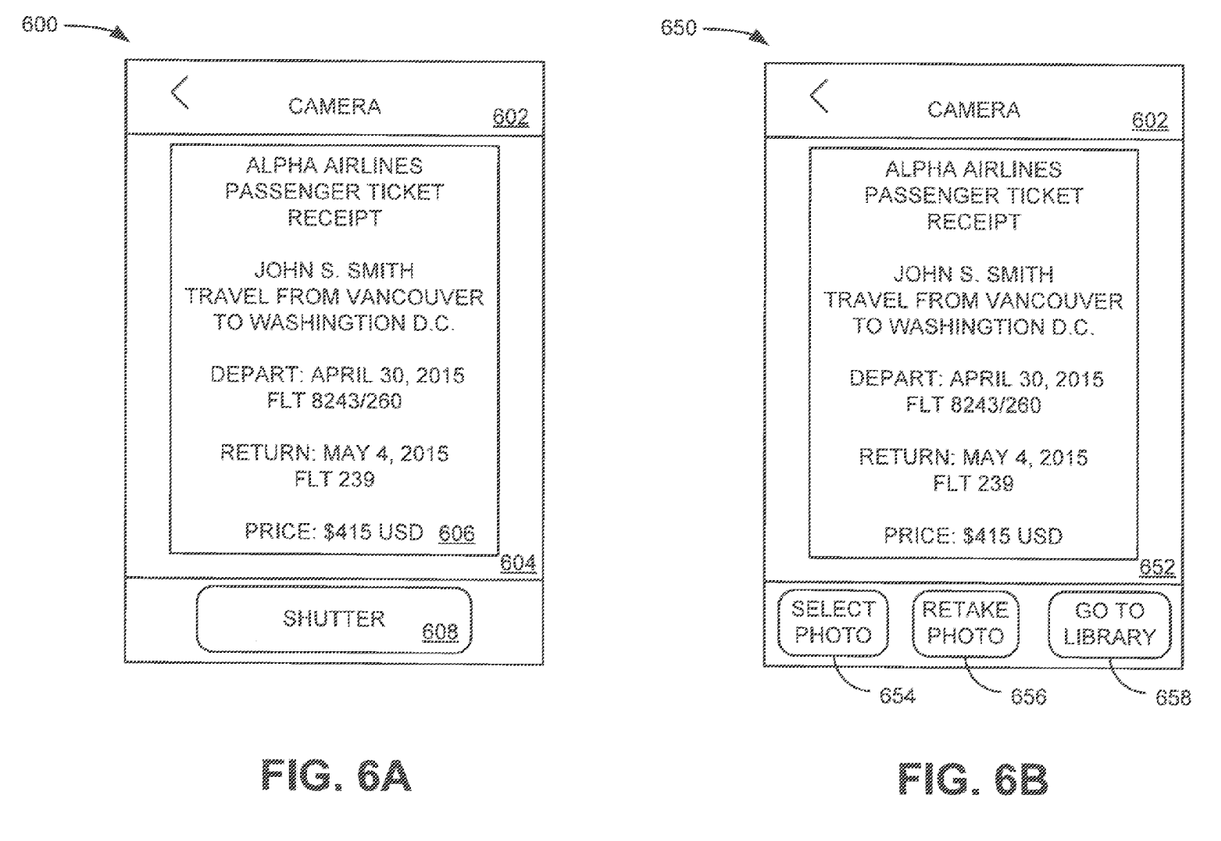
FIG. 6A and FIG. 6B depict examples of graphical user interfaces for capturing an image using a camera and that may be generated under program control using an embodiment.

FIG. 6A and FIG. 6B depict examples of graphical user interfaces 600 and 650 for capturing an image using a camera 118. The user graphical interface 600 is provided by the camera application 116 when the user selects the take photo button 552 of the user interface 550. A first portion 602 of the user interface 600 indicates that the camera application 116 and/or camera 118 have been invoked. A viewfinder portion 604 depicts the visual data currently being captured by the camera 118. A receipt 606 is shown within the viewfinder 604. A shutter button 608 acts as a shutter such that, when selected, the camera application 116 captures and stores the current visual data in memory as a photographic image.

In response to selecting the shutter button 608, the camera application 116 provides the graphical user interface 650 comprising the first portion 602. The user interface 650 comprises an image display portion 652 that displays the captured image. The user interface 650 further comprises a select photo button 654 that, when selected, causes the photo to be sent to the browser 114, as next explained in connection with FIG. 7A. The graphical user interface 650 further comprises a retake photo button 656 that, when selected, returns the camera application 116 to the graphical user interface 600. A library button 658 allows to mobile computer device 106 to access a photo library from which images can be selected.

Figure 7A:
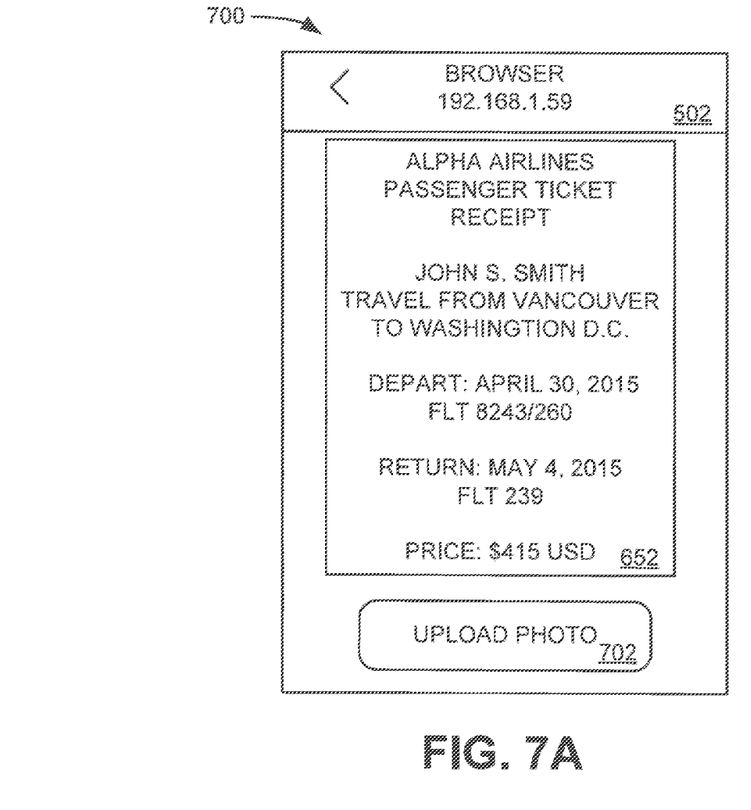
FIG. 7A and FIG. 7B depict examples of graphical user interfaces accessible on a browser for uploading an image and that may be generated under program control using an embodiment.
Figure 7B:
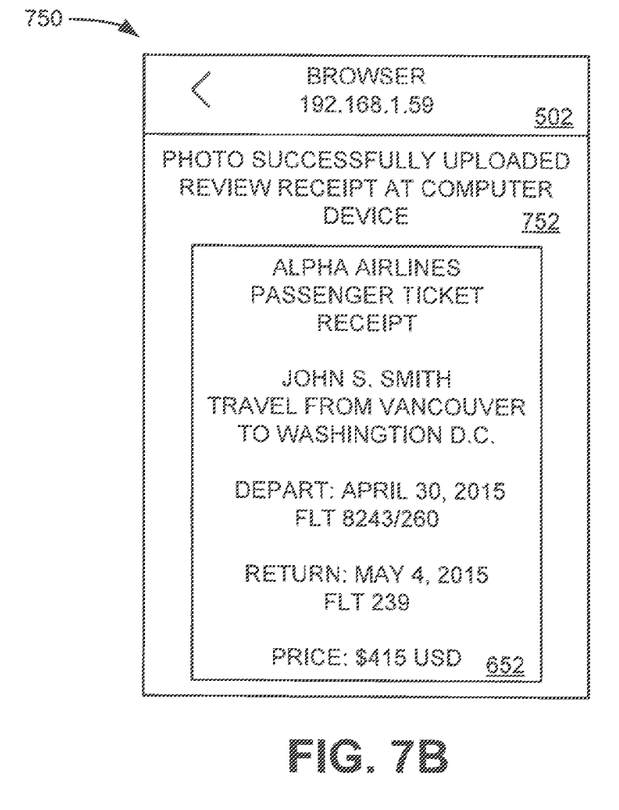

FIG. 7A and FIG. 7B depict examples of graphical user interfaces 700 and 750 accessible on a browser 114 for uploading an image. The mobile computer device 110 provides user interface 700 upon receiving a selection of a stored image in the camera application 116. The interface 700 is displayed in the browser 114 and includes a rendering of the image 652 and an upload button 702. The upload button 702, when selected by the user, instructs the browser 114 to upload the image 652 to the data collection application 108. When the image 652 is successfully uploaded, the browser 114 displays user interface 750 that includes a confirmation 752 that the image 652 was uploaded. The user interface 750 optionally includes a rendering of the uploaded image 652.

Referring again to FIG. 2, in an operation 216, the browser 114 sends the image and the associated GUID to the data collection application 108. In an operation 218, the data collection application 108, using the GUID, associates the received image with the document requested in the operation 202. The image can be associated with the session identifier and/or line item identifier. To upload the image to the application 108, the browser 114 may execute an HTTP POST to the server computer 106 using a URL with a file representing the image, such as a JPG file, as a payload. The data collection application 108 may connect with a system (not depicted) that performs optical character recognition (OCR) or a technology that facilitates manual character recognition. In that manner, the data collection application 108 may verify the data on the image or video with the information already inputted in order to check for errors in an automated or semi-automated fashion.

In an operation 220, the data collection application 108 generates and sends an acknowledgement that the image was received to the browser application 104 of the computer device 102 and the mobile computer device 110. The acknowledgement may include a copy of the image. The acknowledgment may be sent to the messaging application 112 or the browser 114 of the mobile device 110.

Figure 8:
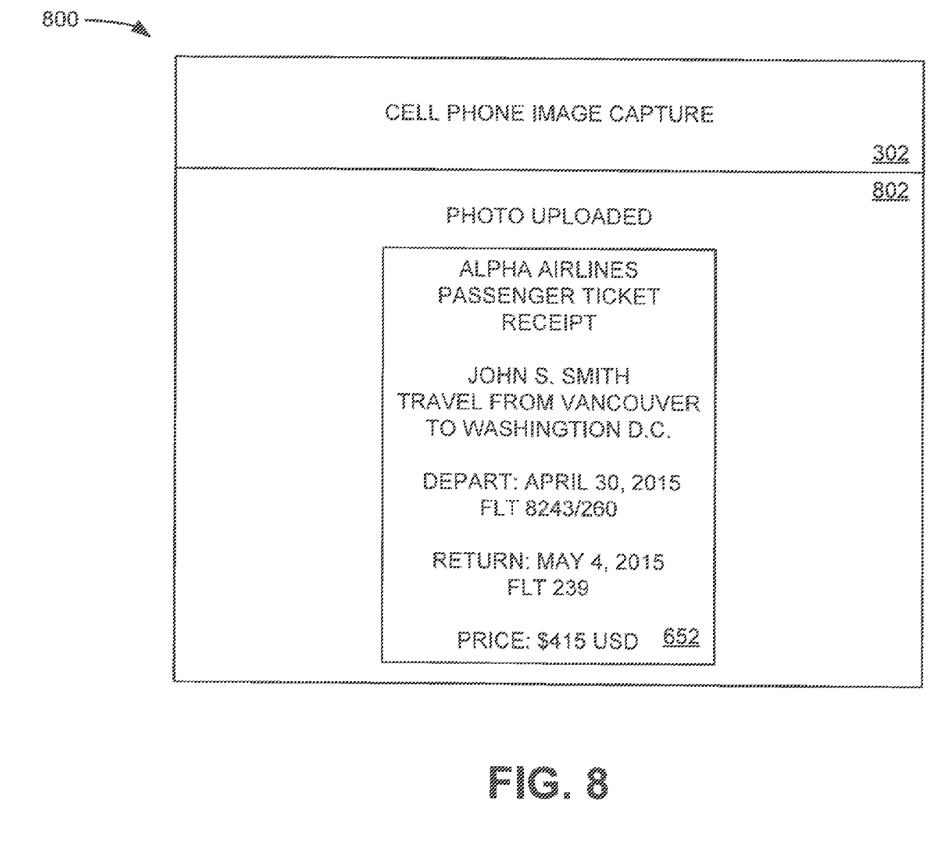
FIG. 8 depicts an example of a graphical user interface that includes an acknowledgement of the uploaded image and that may be generated under program control using an embodiment.

FIG. 8 depicts an example of a user interface 800 that includes an acknowledgement of the uploaded image. The user interface 800 is provided by the computer device 102 via, for example, browser application 104. The user interface 802 includes a confirmation 802 indicating that the image was successfully received from the data collection application 108. The user interface 800 can further include the image 652 of the receipt.

The techniques disclosed herein provide an efficient and rapid means for an application program, such as a server-based program, to obtain images of documents or other subject matter from a computer that is distant from the server computer. Images can be acquired even when one local computer, which is in communication with the server computer, does not have a camera but a second computer, such as a mobile computer, does have a camera. Further, the server computer can contact the mobile computer and cause invocation of its camera and camera application without requiring any special software installation on the mobile computer, using communications protocols with which the mobile computer is already compatible, such as SMS text messaging or MMS messaging. Still further, the camera of the mobile computer serves as a convenient image capture device and the system does not require using a scanner, copier-scanner or multi-function printer (MFP), or other more complex device for image capture. As a result, a desktop or laptop computer can be used efficiently for client-server communication with a web server computer or other server computer that hosts an application, while invoking the camera application of the mobile computer at times when remote image capture is useful. Yet another benefit is that the captured image is automatically communicated back to the server computer via an HTTP POST from the mobile computer to the server computer, and a user of the mobile computer is not required to click a button, select an option, or perform any other operation to accomplish the upload; the user focuses on taking a good image and/or selecting a picture to use.

For convenience, embodiments have been described in the context of invoking a camera or camera application for the purpose of remote capture of a static image and communicating that static image back to a server computer automatically. However, other embodiments may invoke and use any other hardware, software or combination of the mobile computer. For example, one embodiment could request and invoke the camera in video recording mode to capture a moving image.

Another embodiment could request and invoke a microphone and sound recorder application to capture an audio file for submission to the web server computer.

Subject to conformance with security constraints and/or sandboxing, another embodiment could request and invoke any other application installed on the mobile computer and request or obtain data or values that the mobile computer app has authorized for external disclosure or communication. Examples include map location data, notes, reminders, and messaging applications.

4. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
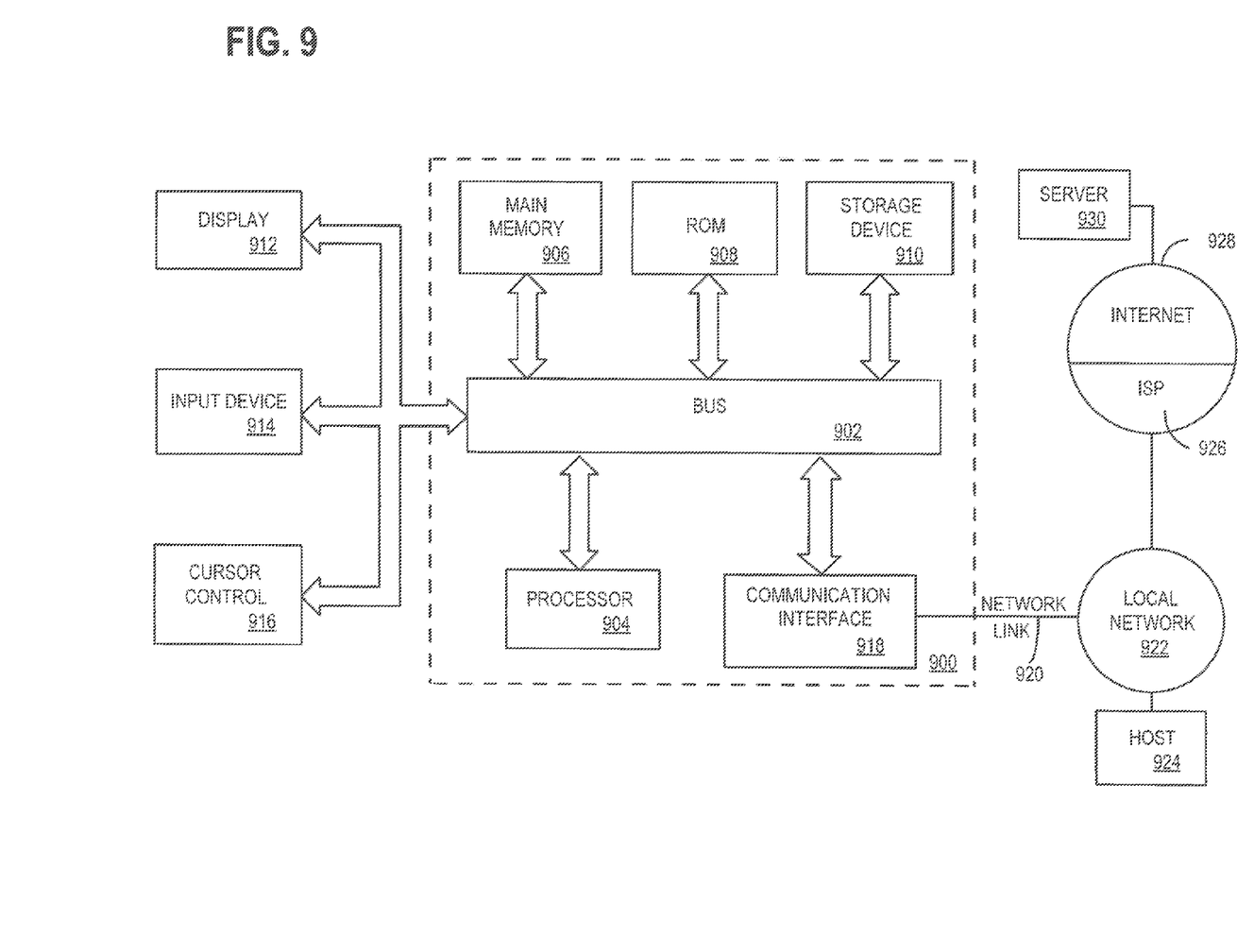
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method of improving efficiency of capturing images of documents at computers, the method comprising the computer-implemented steps of:

using a web server computer, receiving, from a first computer device, an instruction to obtain an image of a document using a mobile computer device comprising a camera;

using the web server computer, assigning a globally unique identifier (GUID) to the image of the document that is yet to be obtained, the GUID associated with a particular session, line item, application, or function at the web server computer;

using the web server computer, generating a unique parameterized uniform resource locator (URL) comprising an image capture function identifier and the assigned GUID, wherein the image capture function identifier identifies image capture program code of the web server computer which when invoked by the mobile computer device causes receiving an image file captured using the camera of the mobile computer device, wherein the image file relates to the image of the document;

using the web server computer, sending, to the mobile computer device, the URL using a messaging service comprising a short message service (SMS) or a multimedia messaging service (MMS), wherein the mobile computer device receives the URL with the GUID and causes invoking of the image capture program code of the web server computer, wherein in response to invoking the image capture program code, the mobile computer device generates the image of the document by capturing the document using the camera of the mobile computer device;

subsequent to the generating, receiving the GUID and the image file from the mobile computer device, by the web server computer, wherein the GUID submitted by the mobile computer device to the web server computer permits the web server computer to associate the received image file with the particular session, line item, application, or function at the web server computer;

upon the receiving the GUID and the image file, by the web server computer, storing the image file in association with the received GUID, thereby associating the image file with the particular session, line item, application, or function;

using the web server computer, in response to the receiving the GUID and the image file, sending the received image file associated with the particular session, line item, application, or function to the first computer device.

2. The method of claim 1, wherein the instruction to obtain the image of the document is received from an expense reimbursement management application at the first computer device.

3. The method of claim 2, wherein the instruction to obtain the image of the document comprises a session identifier and a line item identifier that have been assigned to the image by a document management application.

4. The method of claim 3, further comprising generating the GUID using the session identifier.

5. The method of claim 3, wherein sending the image file comprises sending the session identifier to the first computer device.

6. The method of claim 1, wherein a field configured for receiving the image file is an HTML Media Capture field.

7. The method of claim 1, wherein the first computer device lacks a camera.

8. A system having improved efficiency of capturing images of documents at computers, the system comprising:
one or more processors; and
a non-transitory computer readable medium having instructions embodied thereon, the instructions when executed by the one or more processors, cause performance of:
using a web server computer, receiving, from a first computer device, an instruction to obtain an image of a document using a mobile computer device comprising a camera;
using the web server computer, assigning a globally unique identifier (GUID) to the image of the document that is yet to be obtained, the GUID associated with a particular session, line item, application, or function at the web server computer;
using the web server computer, generating a unique parameterized uniform resource locator (URL) comprising an image capture function identifier and the assigned GUID,
wherein the image capture function identifier identifies image capture program code of the web server computer which when invoked by the mobile computer device causes receiving an image file captured using the camera of the mobile computer device, wherein the image file relates to the image of the document;

using the web server computer, sending, to the mobile computer device, the URL using a messaging service comprising a short message service (SMS) or a multimedia messaging service (MMS), wherein the mobile computer device receives the URL with the GUID and causes invoking of the image capture program code of the web server computer, wherein in response to invoking the image capture program code, the mobile computer device generates the image of the document by capturing the document using the camera of the mobile computer device;

subsequent to the generating, receiving the GUID and the image file from the mobile computer device, by the web server computer, wherein the GUID submitted by the mobile computer device to the web server computer permits the web server computer to associate the received image file with the particular session, line item, application, or function at the web server computer;

upon the receiving the GUID and the image file, by the web server computer, storing the image file in association with the received GUID, thereby associating the image file with the particular session, line item, application, or function;

using the web server computer, in response to the receiving the GUID and the image file, sending the received image file associated with the particular session, line item, application, or function to the first computer device.

9. The system of claim 8, wherein the instruction to obtain the image of the document is received from an expense reimbursement management application at the first computer device.

10. The system of claim 9, wherein the instruction to obtain the image of the document comprises a session identifier and a line item identifier that have been assigned to the image by an document management application.

11. The system of claim 10, further comprising generating the GUID using the session identifier.

12. The system of claim 10, wherein sending the image file comprises sending the session identifier to the first computer device.

13. The system of claim 8, wherein a field configured for receiving the image file is an HTML Media Capture field.

14. The system of claim 8, wherein the first computer device lacks a camera.

15. A non-transitory computer-readable medium storing one or more instructions which, when executed by one or more processors, cause the one or more processors to perform a method of improving efficiency of capturing images of documents at computers, the method comprising:
using a web server computer, receiving, from a first computer device, an instruction to obtain an image of a document using a mobile computer device comprising a camera;
using the web server computer, assigning a globally unique identifier (GUID) to the image of the document that is yet to be obtained, the GUID associated with a particular session, line item, application, or function at the web server computer;
using the web server computer, generating a unique parameterized uniform resource locator (URL) comprising an image capture function identifier and the assigned GUID, wherein the image capture function identifier identifies image capture program code of the web server computer which when invoked by the mobile computer device causes receiving an image file captured using the camera of the mobile computer device, wherein the image file relates to the image of the document;

using the web server computer, sending, to the mobile computer device, the URL using a messaging service comprising a short message service (SMS) or a multimedia messaging service (MMS), wherein the mobile computer device receives the URL with the GUID and causes invoking of the image capture program code of the web server computer, wherein in response to invoking the image capture program code, the mobile computer device generates the image of the document by capturing the document using the camera of the mobile computer device;

subsequent to the generating, receiving the GUID and the image file from the mobile computer device, by the web server computer, wherein the GUID submitted by the mobile computer device to the web server computer permits the web server computer to associate the received image file with the particular session, line item, application, or function at the web server computer;

upon the receiving the GUID and the image file, by the web server computer, storing the image file in association with the received GUID, thereby associating the image file with the particular session, line item, application, or function;

using the web server computer, in response to the receiving the GUID and the image file, sending the received image file associated with the particular session, line item, application, or function to the first computer device.

16. The non-transitory computer-readable medium of claim 15, wherein the instruction to obtain the image of the document is received from an expense reimbursement management application at the first computer device.

17. The non-transitory computer-readable medium of claim 16, wherein the instruction to obtain the image of the document comprises a session identifier and a line item identifier that have been assigned to the image by a document management application.

18. The non-transitory computer-readable medium of claim 17, the method further comprising generating the GUID using the session identifier.

19. The non-transitory computer-readable medium of claim 17, wherein sending the image file comprises sending the session identifier to the first computer device.

20. The non-transitory computer-readable medium of claim 15, wherein a field configured for receiving the image file is an HTML Media Capture field.

* * * * *